United States Patent
Lin et al.

(10) Patent No.: US 11,933,309 B2
(45) Date of Patent: Mar. 19, 2024

(54) METHOD OF STARTING A FAN USING AN OPEN LOOP STARTING STAGE WITH A DECREASING DRIVE SIGNAL VALUE

(71) Applicant: DELTA ELECTRONICS, INC., Taoyuan (TW)

(72) Inventors: Yi-Fan Lin, Taoyuan (TW); Chung-Hung Tang, Taoyuan (TW); Cheng-Chieh Liu, Taoyuan (TW); Chun-Lung Chiu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/871,504

(22) Filed: Jul. 22, 2022

(65) Prior Publication Data

US 2022/0356882 A1 Nov. 10, 2022

Related U.S. Application Data

(60) Division of application No. 16/524,814, filed on Jul. 29, 2019, now Pat. No. 11,473,584, which is a continuation of application No. 14/925,246, filed on Oct. 28, 2015, now abandoned.

(60) Provisional application No. 62/073,477, filed on Oct. 31, 2014.

(30) Foreign Application Priority Data

Sep. 30, 2015 (TW) .................................. 104132038

(51) Int. Cl.
*F04D 19/00* (2006.01)
*F04D 25/06* (2006.01)
(Continued)

(52) U.S. Cl.
CPC ........... *F04D 19/002* (2013.01); *F04D 25/06* (2013.01); *F04D 27/004* (2013.01); *F04B 49/02* (2013.01);
(Continued)

(58) Field of Classification Search
CPC ........... F04B 49/02; F04B 49/06; F04B 49/20
See application file for complete search history.

(56) References Cited

U.S. PATENT DOCUMENTS 4,347,446 A 8/1982 Price
5,125,571 A 6/1992 Herber
(Continued)

FOREIGN PATENT DOCUMENTS

JP 200050681 A 2/2000

*Primary Examiner* — Nathan C Zollinger
*Assistant Examiner* — Timothy P Solak
(74) *Attorney, Agent, or Firm* — Muncy, Geissler, Olds & Lowe, P.C.

(57) ABSTRACT

A method for controlling a fan in a fan start-up stage including a first time period and a second time period comprises the following steps of: during the first time period, continuously providing a first driving signal to drive the fan; and during the second time period, continuously providing a second driving signal to drive the fan; wherein, the signal value of the first driving signal gradually decreases until being equal to the signal value of the second driving signal. Wherein the signal value of the first driving signal non-linearly decreases, the signal value of the second driving signal is an unchanged value. Wherein, the first time period and the second time period are adjusted for a different fan but the sum of the first time period and the second time period is always the same. A fan is also disclosed.

15 Claims, 7 Drawing Sheets

(51) Int. Cl.
  *F04D 27/00* (2006.01)
  *F04B 49/02* (2006.01)
  *F04B 49/06* (2006.01)
  *F04B 49/20* (2006.01)
  *F04D 17/16* (2006.01)
  *F04D 29/66* (2006.01)

(52) U.S. Cl.
  CPC ............ *F04B 49/06* (2013.01); *F04B 49/065* (2013.01); *F04B 49/20* (2013.01); *F04D 17/16* (2013.01); *F04D 29/661* (2013.01); *F05D 2260/85* (2013.01)

(56) References Cited

U.S. PATENT DOCUMENTS

| | | |
|---|---|---|
| RE34,399 E | 10/1993 | Gami |
| 5,327,052 A | 7/1994 | Sakurai |
| 5,484,012 A | 1/1996 | Hiratsua |
| 5,744,923 A | 4/1998 | Strauss |
| 6,040,668 A | 3/2000 | Huynh |
| 6,411,072 B1* | 6/2002 | Feldman ................ G05F 5/00 323/299 |
| 2003/0193307 A1 | 10/2003 | Burstein |
| 2005/0013114 A1* | 1/2005 | Ha ................... H05K 7/20209 361/679.48 |
| 2006/0181232 A1 | 8/2006 | Oljaca |
| 2007/0001635 A1 | 1/2007 | Ho |
| 2007/0046230 A1 | 3/2007 | Tsutsui |
| 2007/0133956 A1* | 6/2007 | Chiu ..................... H02P 7/2913 388/822 |
| 2007/0285036 A1* | 12/2007 | McCurdy ............. G11B 19/00 318/272 |
| 2007/0292257 A1 | 12/2007 | Ooi |
| 2008/0037164 A1 | 2/2008 | Oh |
| 2009/0045762 A1 | 2/2009 | Hayashi |
| 2009/0251084 A1 | 10/2009 | Haas |
| 2010/0026219 A1 | 2/2010 | Nakai |

* cited by examiner

METHOD OF STARTING A FAN USING AN OPEN LOOP STARTING STAGE WITH A DECREASING DRIVE SIGNAL VALUE

CROSS REFERENCE TO RELATED APPLICATIONS

This Non-provisional application is a Divisional Application (DA) of U.S. Ser. No. 16/524,814, filed on Jul. 29, 2019, now U.S. Pat. No. 11,473,584, which is a Continuation Application (CA) of U.S. application Ser. No. 14/925,246, now abandoned, which claims the priority benefits of U.S. provisional application Ser. No. 62/073,477, filed on Oct. 31, 2014 and Taiwan application serial No. 104132038, filed on Sep. 30, 2015. The entirety of the above-mentioned patent applications are hereby incorporated by references herein and made a part of specification.

BACKGROUND

Technical Field

The invention relates to a fan and a method for controlling fan start-up, in particular to a three-phase fan and a method for controlling a three-phase fan in the start-up stage.

Related Art

For saving energy of a notebook computer system, the notebook computer system is often switched between a sleep mode and a normal mode. Thus, the fan may frequently stop operating or restart to operate for different operation modes. However, obvious start-up noise usually occurs while the fan restart to operate from stopping operation. The reason for the start-up noise is that: when the fan restarts to operate, a driving signal with constant high energy is provided in the open loop control stage to obligately start the fan, and no feedback signal from any sensor is utilized to adjust the driving signal. However, the start-up noise depends on the energy of the driving signal.

FIG. 1 is a schematic diagram showing the duty cycle, noise and rotational speed of the conventional fan in the start-up stage. The fan continuously increases its rotational speed according to the driving signal S so the noise becomes worsened. After the driving signal S drives the fan for a time period $T_{openloop}$ namely the impeller of the fan is successfully rotated and the rotational speed of the fan reaches a target rotational speed, the fan switches to a close loop control stage. In other words, in this stage, a feedback signal from a detection circuit is utilized to adjust the signal value of the driving signal (i.e. the duty cycle decreases from A to A'), and the fan rotates at a target rotational speed. However, because the energy of the driving signal for the fan at the start-up stage is too large, the target rotational speed for the fan is much lower than the threshold rotational speed for the open loop control stage so the overshoot of the fan rotational speed occurs in the start-up procedure and thus obvious start-up noise occurs.

Therefore, a fan and a method for controlling fan start-up with reduced noise as much as possible are desirable.

SUMMARY

An aspect of the disclosure is to provide a fan and a method for controlling fan start-up with reduced noise.

A method for controlling a fan in a fan start-up stage, which includes a first time period and a second time period, comprises: during the first time period, continuously providing a first driving signal to drive the fan; and during the second time period, continuously providing a second driving signal to drive the fan; wherein, during the first time period the signal value of the first driving signal gradually decreases until being equal to the signal value of the second driving signal, and the signal value of the first driving signal is initially greater than the signal value of the second driving signal.

In one embodiment, the signal value of the second driving signal is an unchanged value.

In one embodiment, the fan comprises an impeller, a motor and a control circuit. The motor is connected to the impeller and drives the impeller to operate, and the motor is electrically connected to the control circuit. The control circuit comprises a control unit and a detection unit, and the detection unit detects the current phase or back emf of the motor to output a feedback signal to the control unit. The method further comprises: after completing the fan start-up stage, providing a third driving signal to drive the fan according to the feedback signal.

In one embodiment, the first driving signal, the second driving signal and the third driving signal are provided by the control unit.

In one embodiment, the first driving signal, the second driving signal and the third driving signal are PWM signals or DC voltage signals.

In one embodiment, the signal value of the first driving signal linearly decreases.

In one embodiment, the signal value of the first driving signal non-linearly decreases.

In one embodiment, the sum of the first time period and the second time period is constant.

A fan comprises an impeller, a motor and a control circuit. The motor is connected to the impeller and drives the impeller to operate. The control circuit is electrically connected to the motor and comprises a control unit. In a fan start-up stage, the control unit provides a first driving signal and a second driving signal to drive the fan. The fan start-up stage includes a first time period and a second time period. During the first time period the control unit continuously provides the first driving signal to drive the fan, and during the first time period the signal value of the first driving signal gradually decreases until being equal to the signal value of the second driving signal. During the second time period the control unit continuously provides the second driving signal to drive the fan, and the signal value of the first driving signal is initially greater than the signal value of the second driving signal.

In one embodiment, the signal value of the second driving signal is an unchanged value.

In one embodiment, the control circuit further comprises a detection unit which detects the current phase or back emf of the motor and outputs a feedback signal to the control unit. After completing the fan start-up stage, the control unit provides a third driving signal to drive the fan according to the feedback signal.

In summary, regarding the fan and the method for controlling fan start-up, in the fan start-up stage, by gradually decreasing the energy of the first driving signal and by controlling the rotational speed of the fan with the second driving signal in the open loop control stage, the overshoot of the rotational speed of the fan occurs as little as possible. Therefore, the start-up noise is reduced and the start-up capability is robust so continuously outputting higher energy is not needed and the electrical energy is saved.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1:
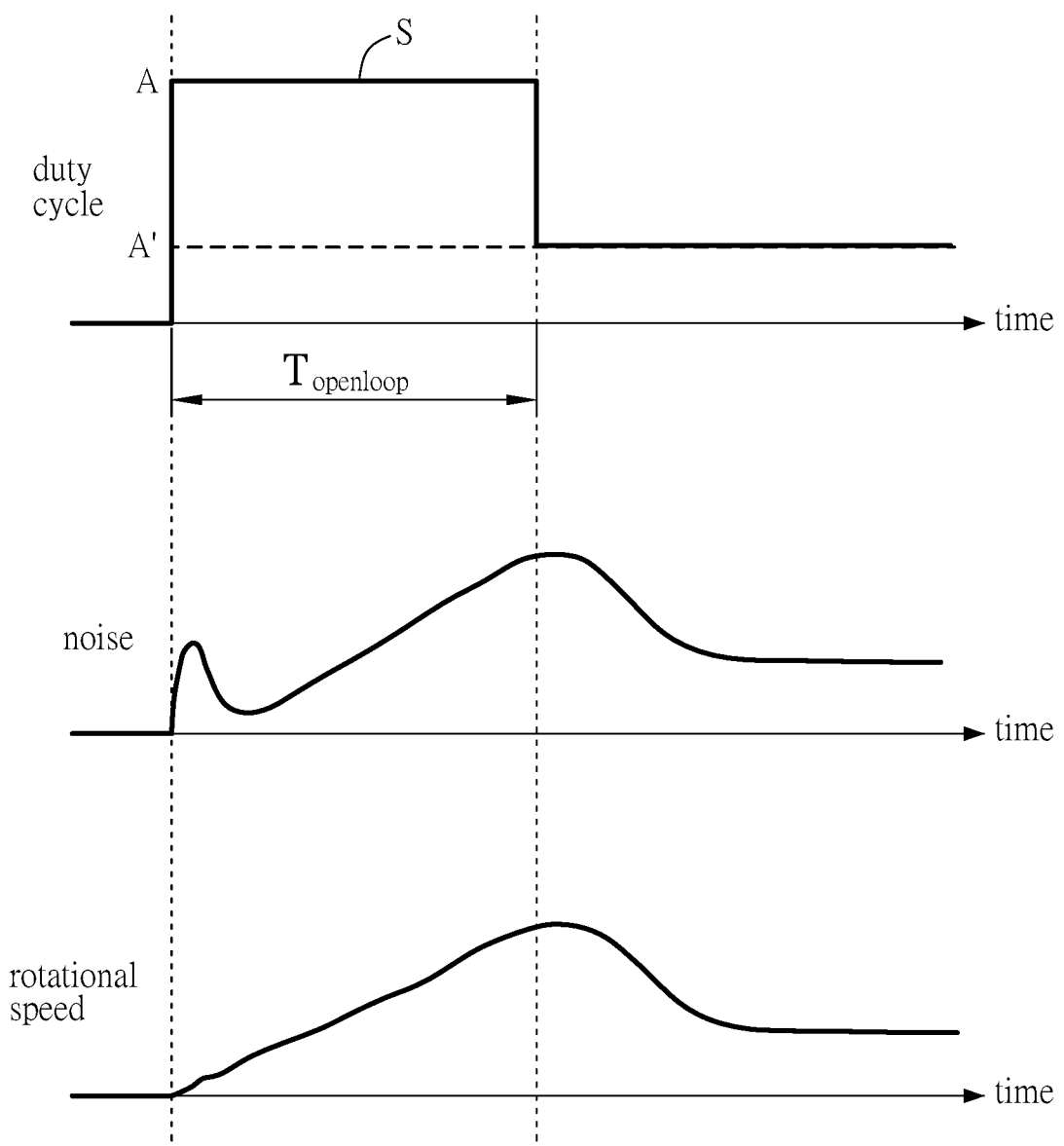
FIG. 1 is a schematic diagram showing the duty cycle, noise and rotational speed of the conventional fan in the start-up stage.
Figure 2:
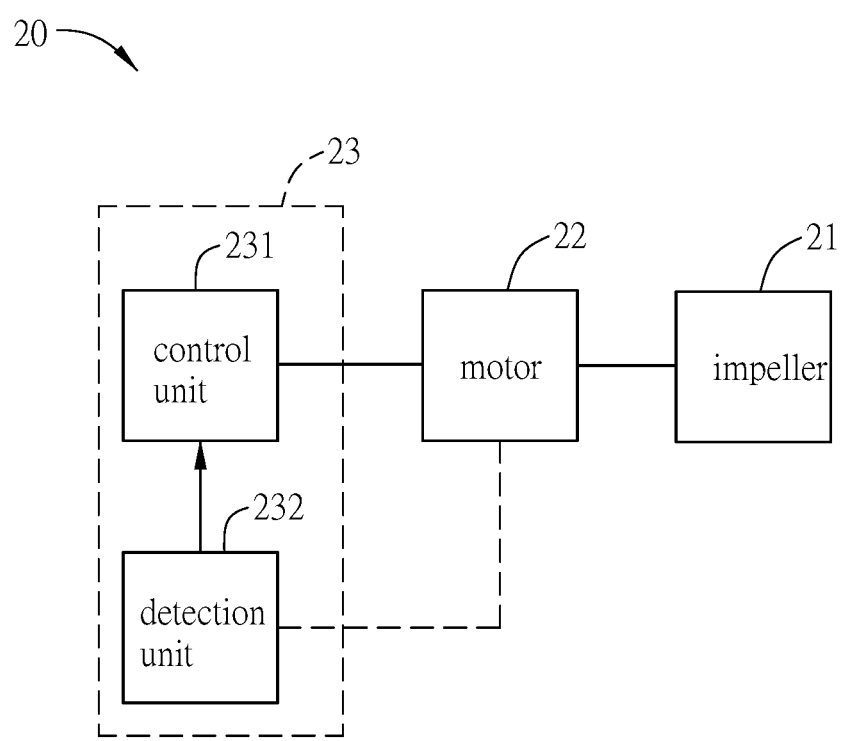
FIG. 2 is a block diagram of the fan according to the embodiment.
Figure 3A:
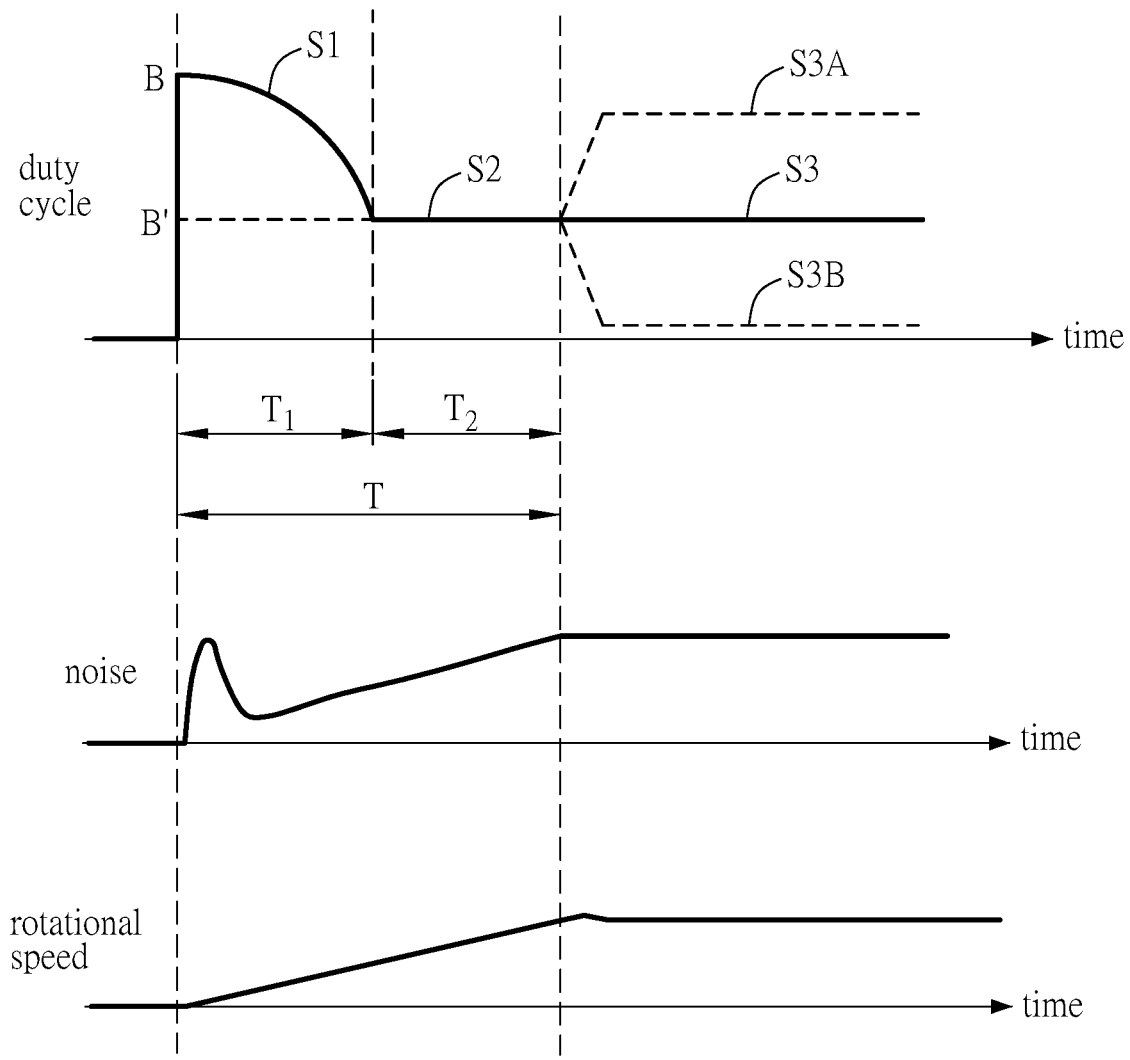
FIG. 3A is a schematic diagram showing the duty cycle, noise and rotational speed according to the embodiment.
Figure 3B:
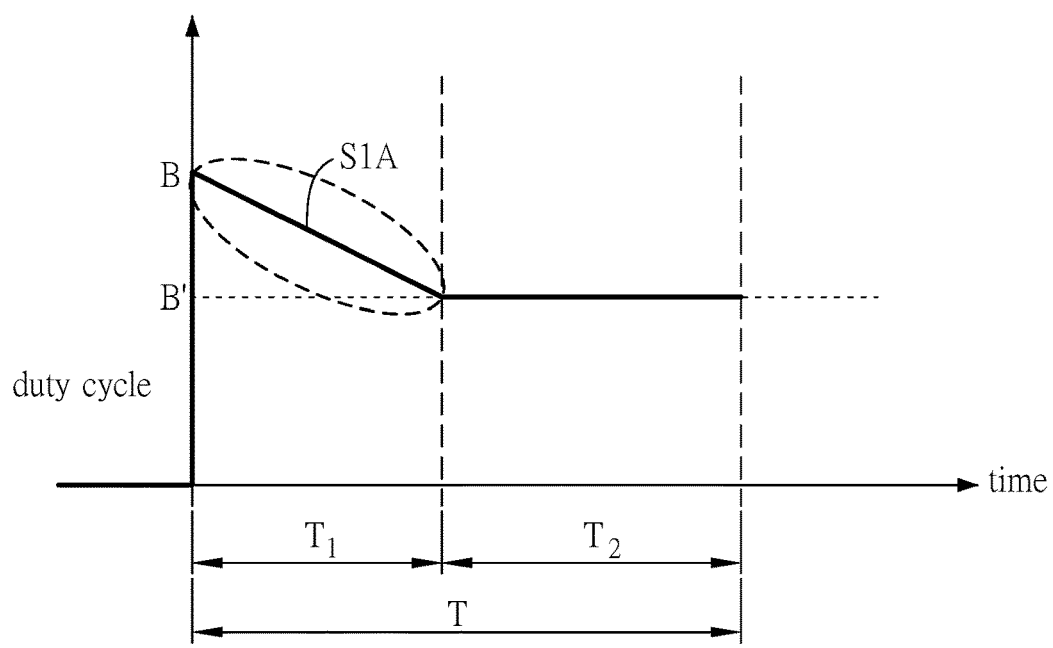
FIG. 3B to FIG. 3E are schematic diagrams of the first driving signal in FIG. 3A in different decrease modes.
Figure 3C:
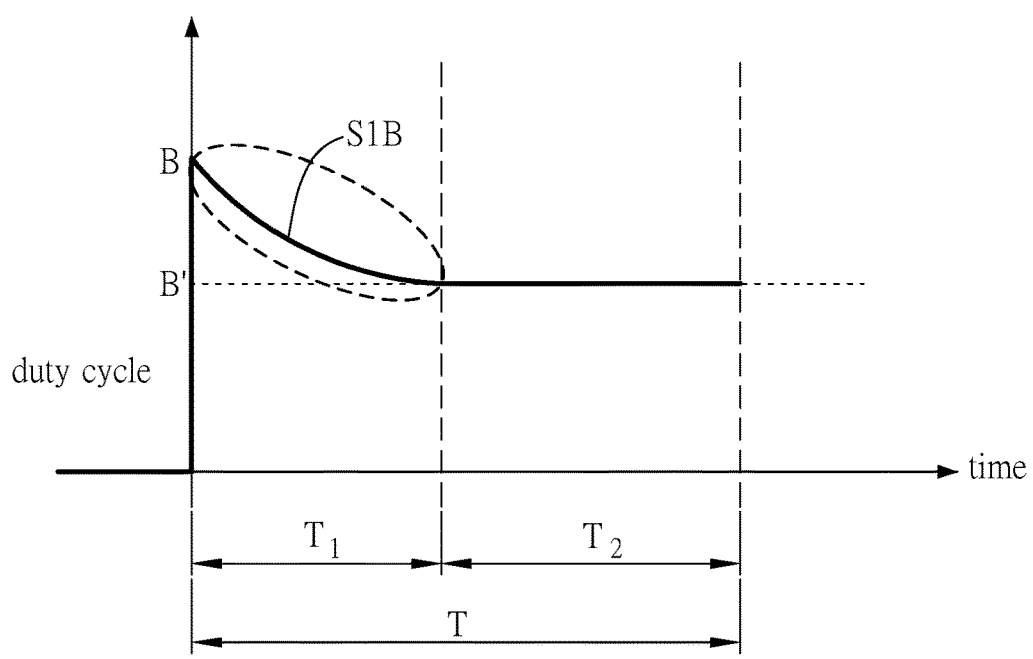
Figure 3D:
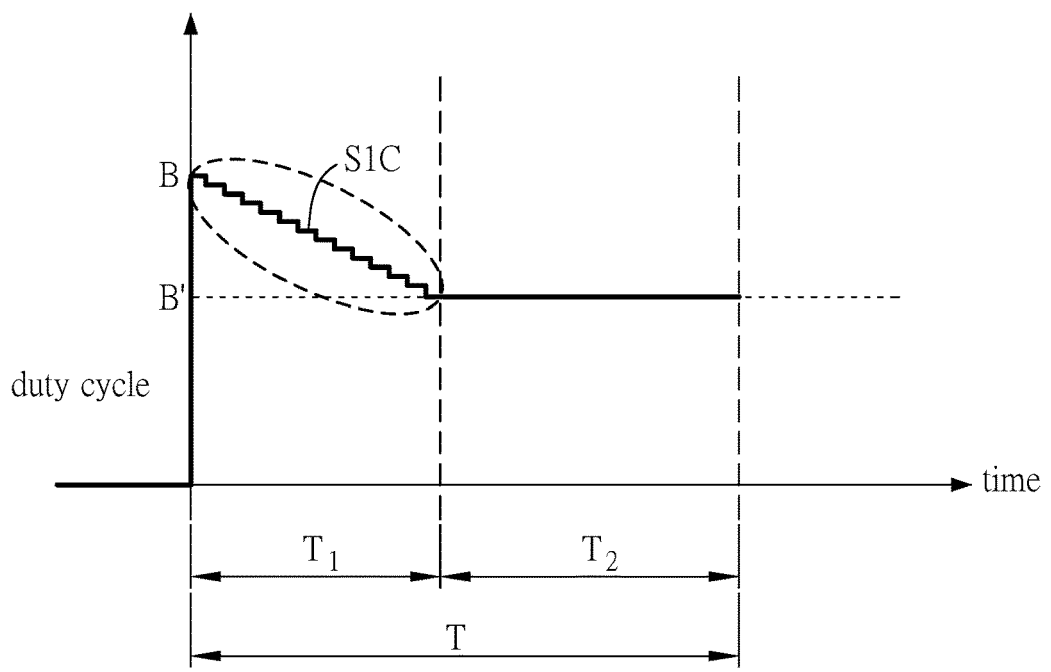
Figure 3E:
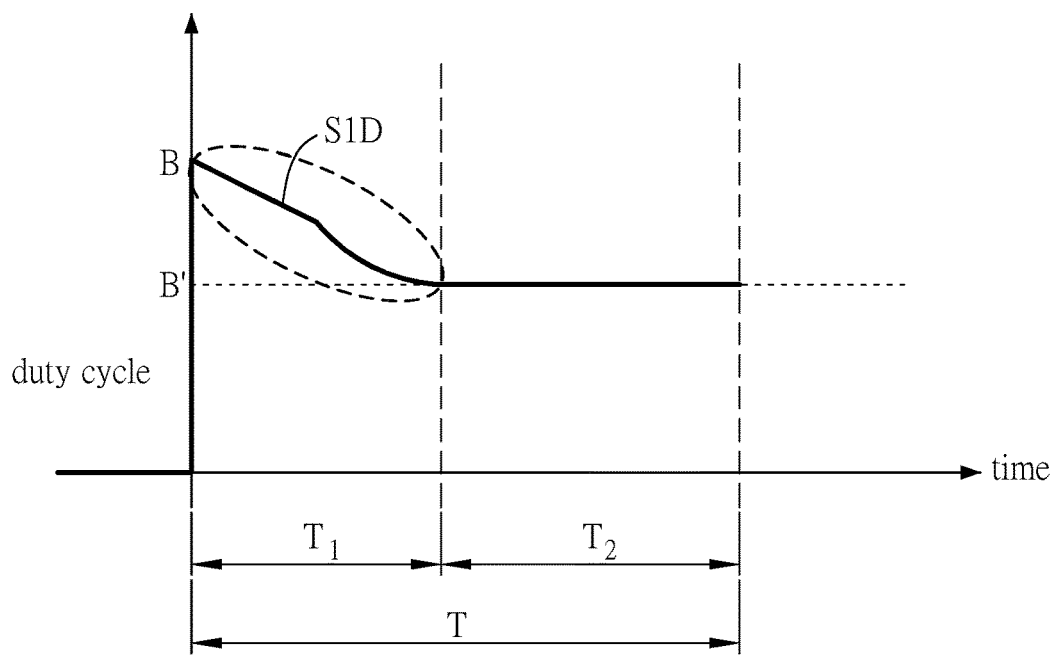

Referring to FIG. 2 and FIG. 3A to FIG. 3E. FIG. 2 is a block diagram of the fan according to the embodiment. FIG. 3A is a schematic diagram showing the duty cycle, noise and rotational speed according to the embodiment. FIG. 3B to FIG. 3E are schematic diagrams of the first driving signal S1 in FIG. 3A in different decrease modes.

Referring to FIG. 2, the fan 20 comprises an impeller 21, a motor 22 and a control circuit 23. The motor 22 is a three-phase motor. It is connected to the impeller 21 and the electrically connected to the control circuit 23, and drives the impeller 21 to operate for example to rotate according to the driving signal outputted by the control circuit 23. Furthermore, the control circuit 23 comprises a control unit 231 and a detection unit 232. The control unit 231 provides the driving signal to drive the impeller 21. The detection unit 232 detects the current phase or back emf of the motor 22, and sends a feedback signal to the control unit 231. Thus, in the close loop control stage, the control unit 231 adjusts the driving signal according to the feedback signal. In other embodiments, the control unit 231 and the detection unit 232 may constitute the same element for example they are integrated in the same element.

To reduce start-up noise together with start-up capability, in the open loop control stage during the start-up procedure, a variable output control is utilized. Referring to FIG. 2 and FIG. 3A, when the impeller 21 restarts to operate from stop, in the open loop control stage during the first time period T1 the control unit 231 continuously provides a first driving signal S1 to drive the motor 22 to rotate the impeller 21. After the impeller 21 is successfully rotated, in the open loop control stage during the second time period T2 the control unit 231 continuously provides a second driving signal S2 to drive the impeller 21. During the first time period T1, the signal value of the first driving signal S1 has larger output energy and the output energy gradually decreases (the signal value decreases from B to B'). The signal value of the second driving signal S2 is an unchanged output energy value (B'), and the signal value of the first driving signal S1 initially at B is greater than the signal value of the second driving signal S2 at B'. The final signal value of the first driving signal S1 at B' is equal to the initial signal value of the second driving signal S2 at B'. The initial signal value of the first driving signal S1 at B may be a minimum duty cycle for starting the fan 20, and the initial signal value of the second driving signal S2 at B' may be the minimum duty cycle for operating the fan 20. In the embodiment, the first driving signal S1 and the second driving signal S2 may be PWM signals or DC voltage signals. The signal values for the first driving signal S1 and the second driving signal S2 may be preset in the control unit 231.

Besides, the sum of the first time period T1 and the second time period T2 mentioned above is kept unchanged, namely the time period for open loop T in the open loop control stage (i.e. the fan start-up stage). The first time period T1 and the second time period T2 are within the open loop control stage. After the time period for open loop T in the open loop control stage, the close loop control stage is entered. Thus, as shown in FIG. 3A, while the rotational speed of the impeller 21 gradually increases until the time reaches the time period for open loop T, the corresponding noise does not obviously become worsened. Because the signal value of the first driving signal S1 gradually decreases to the signal value of the second driving signal S2 (the signal value decreases from B to B'), the fan overshoot occurs as little as possible. Moreover, the time period for open loop T may vary due to various types of fans. Thus, the designer should adjust the first time period T1, the second time period T2, and the sum of the first time period T1 and the second time period T2 (the time period for open loop T in the open loop control stage) depending on various types of fans so the fan 20 would stably operate in the fan start-up stage and the start-up noise caused by the fan 20 would occur as little as possible.

After the fan 20 stably operates, it enters or begins to operate in the close loop control stage (i.e. the regular operation stage). Here, the control unit 231 of the control circuit 23 begins to provide a third driving signal S3 to drive the motor 22 to rotate the impeller 21 according to the feedback signal from the detection unit 232. In the embodiment, the signal value of the third driving signal S3 may be greater than the signal value of the second driving signal S2 (i.e. the third driving signal S3A in FIG. 3A) or equal to the signal value of the second driving signal S2 (i.e. the third driving signal S3 in FIG. 3A) or smaller than the signal value of the second driving signal S2 (i.e. the third driving signal S3B in FIG. 3A), and the designer may adjust it depending on demand. In other embodiments, after the second time period T2 ends (i.e. the open loop control stage ends), the close loop control stage is entered and the control unit 231 provides the third driving signal S3, which is the same with the second driving signal S2, to continuously drive the motor 22 to rotate the impeller 21 for a short time. Then, it adjusts the rotational speed according to the feedback signal outputted from the detection unit 232. In other embodiments, the signal value of the second driving signal S2 (the open loop control stage) may slightly higher or slightly lower than the signal value of the third driving signal S3 (the close loop control stage) to slightly change the rotational speed so as to reduce switching noise when switching control modes.

In the embodiment, the signal value of the first driving signal S1 gradually decreases. For example, it may linearly decrease or non-linearly decrease, and the designer may adjust it depending on demand. The decrease of the first driving signal may refer to FIG. 3B to FIG. 3E which indicate the curve in linear decrease mode S1A (shown in FIG. 3B), the curve in curved line decrease mode S1B (shown in FIG. 3C), the curve in ladder decrease mode S1C (shown in FIG. 3D), or the curve in combination mode of linear decrease and curved line decrease SID (shown in FIG. 3E). The curves S1A-S1D in the above mentioned decrease modes may be parabolas, hyperbolas or any curved lines to make the signal value of the first driving signal S1 gradually decrease during the first time period T1.

Figure 4:
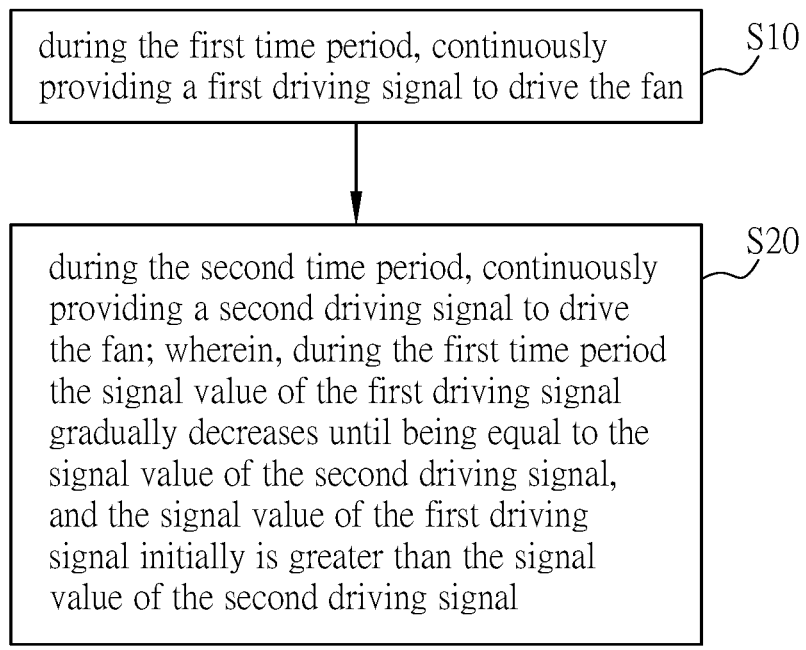
FIG. 4 is a flow chart of the steps of the method for controlling start-up according to the embodiment.

FIG. 4 is a flow chart of the steps of the method for controlling start-up according to the embodiment. The method is adapted to the control for the fan start-up stage. The fan start-up stage includes a first time period and a second time period. The method comprises at least the following steps of: during the first time period continuously providing a first driving signal to drive the fan (the step S10); and during the second time period continuously providing a second driving signal to drive the fan; wherein during the first time period, the signal value of the first driving signal gradually decreases until the signal value of the first driving signal is equal to the signal value of the second driving signal. The signal value of the first driving signal is initially greater than the signal value of the second driving signal (the step S20).

In the step S10, the signal value of the first driving signal S1 gradually decreases during the first time period T1. For example, it linearly decreases or non-linearly decreases, and the designer may adjust them depending on demand.

Besides, in the step S20 in the embodiment, the signal value of the second driving signal S2 is an unchanged value. In other embodiments, the signal value of the second driving signal S2 may gradually decrease or gradually increase, and the designer may adjust it depending on demand. Moreover, the length of the second time period T2 may be adjusted depending on the stable operation duration of the fan. The designer may adjust it according to the required time for the fan to operate stably.

In the embodiment, the first driving signal S1 and the second driving signal S2 may be PWM signals or DC voltage signals, and the designer may adjust them depending on demand. Moreover, the initial signal value B of the first driving signal S1 is the minimum duty cycle for the fan 20 to start, namely the torque provided by the first driving signal S1 on the fan needs to be greater than the torque caused by the maximum static friction on the fan 20. Due to various kinds of fan structures, the maximum static friction on the fan 20 may be different. Besides, the initial signal value B' of the second driving signal S2 is the minimum duty cycle for the fan 20 to operate, namely the torque provided by the second driving signal S2 on the fan needs to be greater than the torque caused by the kinetic friction during the operation of the fan 20. Therefore, the first driving signal S1 and the second driving signal S2 should be adjusted depending on different fan structures and/or motors.

Figure 5:
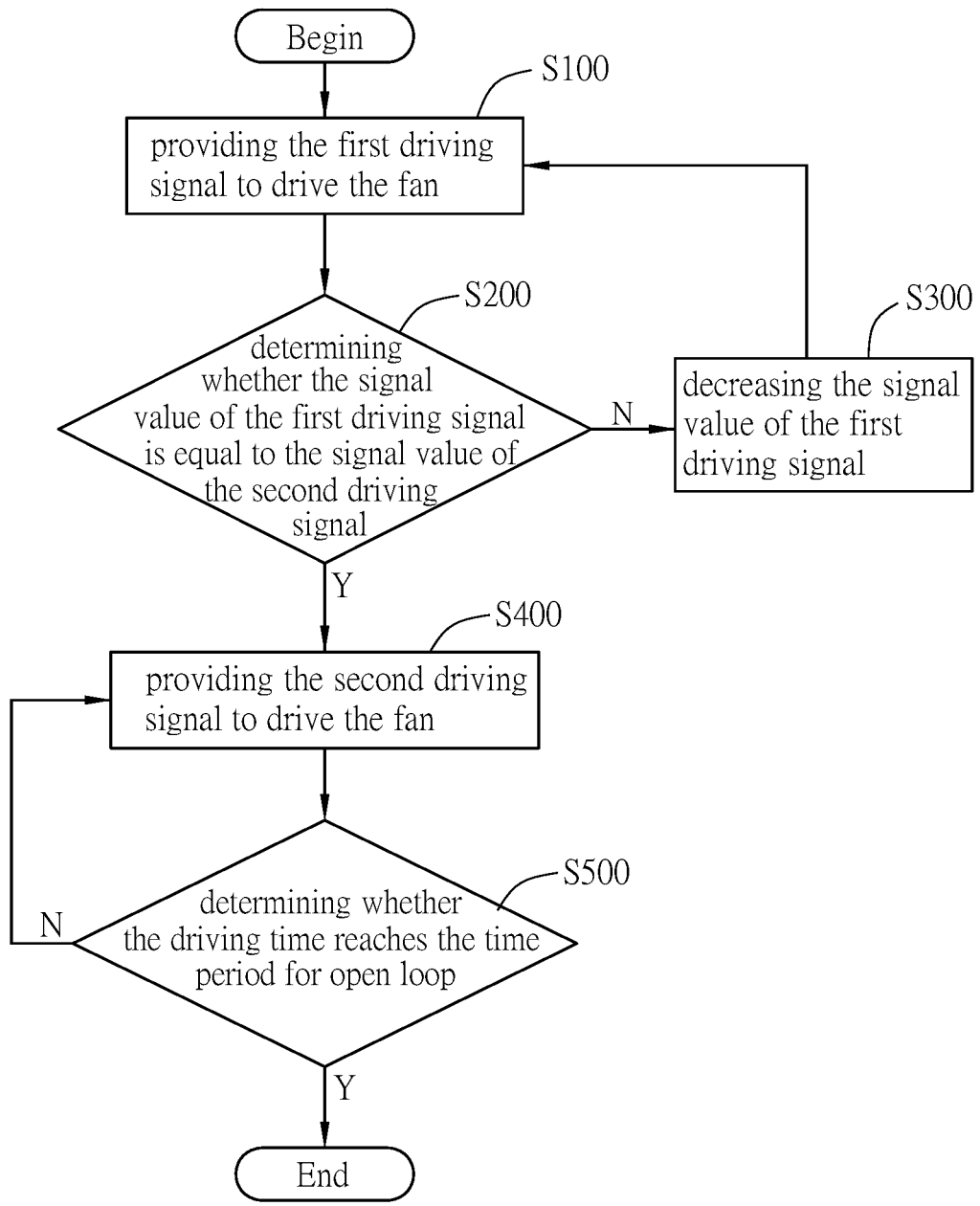
FIG. 5 is a control flow chart of the method for controlling start-up according to the embodiment.

FIG. 5 is a control flow chart of the method for controlling start-up according to the embodiment. The method is adapted to the control in the fan start-up stage. The control procedure of the method for controlling start-up comprises at least following steps: providing the first driving signal to drive the fan (the step S100); determining whether the signal value of the first driving signal is equal to the signal value of the second driving signal (the step S200). If not, decreasing the signal value of the first driving signal (the step S300); if yes, providing the second driving signal to drive the fan (the step S400); then determining whether the driving time reaches the time period for open loop (the step S500).

In the step S100, the first driving signal is provided to drive the fan. After a predefined time period, the step S200 is performed. Namely, after the predefined time period, the method determines whether the signal value of the first driving signal is equal to the signal value of the second driving signal.

In the step S200, if the signal value of the first driving signal is not equal to the signal value of the second driving signal, then the step S300 is performed. Namely, the signal value of the first driving signal is decreased, and then the step S100 is performed to drive the fan with the decreased first driving signal after decreasing the signal value of the first driving signal. Besides, in the step S200, if the signal value of the first driving signal is equal to the signal value of the second driving signal, then the step S400 is performed. Namely, the second driving signal is provided to drive the fan. Finally, the step S500 is performed.

In the step S500, it is determined whether the time reaches the time period for open loop T. If the driving time reaches the time period for open loop T, the open loop control stage for the fan is complete and then the close loop control stage is entered; if the driving time does not reach the time period for open loop T, the step S400 is performed.

In the embodiment, the signal value of the first driving signal S1 gradually decreases during the first time period T1. The required time for the signal value of the first driving signal S1 to decrease to the signal value of the second driving signal S2 is the first time period T1 mentioned above. Besides, since the sum of the first time period T1 and the second time period T2 mentioned above is kept unchanged, the time period for open loop T (the sum of the first time period T1 and the second time period T2) is kept unchanged. Because the time period for open loop T is kept unchanged, the second time period T2 is subsequent to the first time period T1, and then the second driving signal S2 is continuously provided to drive the fan until reaching the time period for open loop T.

In summary, regarding the fan and the method for controlling fan start-up, in the fan start-up stage, by gradually decreasing the energy of the first driving signal and by controlling the rotational speed of the fan with the second driving signal in the open loop control stage, the overshoot of the rotational speed of the fan occurs as little as possible. Therefore, the start-up noise is reduced and the start-up capability is robust so continuously outputting higher energy is not needed and the electrical energy is saved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fan, comprising:
    an impeller;
    a control circuit comprising a control unit; and
    a motor, connected to the impeller and electrically connected to the control circuit, the motor configured to continuously receive a first driving signal from the control unit to drive the impeller during a full period of a first time period of a fan open loop start-up stage, and configured to continuously receive a second driving signal from the control unit to drive the fan during a second time period of the fan open loop start-up stage, wherein the fan at a stop status directly enters the first time period of the fan open loop start-up stage when starting to drive the fan;
wherein a signal value of the first driving signal is initially greater than a signal value of the second driving signal, and decreases from a beginning of the first driving signal until being equal to the signal value of the second driving signal;
wherein an initial signal value of the first driving signal is at a minimum duty cycle for starting the fan, an initial signal value of the second driving signal is at a minimum duty cycle for operating the fan, and the minimum duty cycle for starting the fan is larger than the minimum duty cycle for operating the fan;
wherein the signal value of the first driving signal non-linearly decreases, the signal value of the second driving signal is an unchanged value;
wherein the first time period and the second time period are adjusted for a different fan but the sum of the first time period and the second time period is always the same.

2. The fan of claim 1, wherein the signal value of the second driving signal is a constant value.

3. The fan of claim 1, wherein the control circuit further comprises:
a detection unit, detecting the current phase or back emf of the motor and outputting a feedback signal to the control unit,
wherein after completing the fan open loop start-up stage, the control unit provides a third driving signal to drive the fan according to the feedback signal.

4. The fan of claim 3, wherein the third driving signal is PWM signal or DC voltage signal.

5. The fan of claim 1, wherein the first driving signal and the second driving signal are PWM signals or DC voltage signals.

6. The fan of claim 1, wherein,
at a beginning of the first time period, the first driving signal increases a rotational speed of the fan.

7. The fan of claim 6, wherein,
during the full period of the first time period, the first driving signal increases the rotational speed of the fan; and
during a full period of the second time period, the second driving signal increases the rotational speed of the fan.

8. A method for controlling a fan in a fan open loop start-up stage including a first time period and a second time period, comprising:
during a full period of the first time period of the fan open loop start-up stage, a motor of the fan continuously receiving a first driving signal to drive the fan, wherein the fan at a stop status directly enters the first time period of the fan open loop start-up stage when starting to drive the fan;
during the second time period of the fan open loop start-up stage, the motor of the fan continuously receiving a second driving signal to drive the fan,
wherein a signal value of the first driving signal is initially greater than a signal value of the second driving signal, and decreases from a beginning of the first driving signal until being equal to the signal value of the second driving signal;
wherein an initial signal value of the first driving signal is at a minimum duty cycle for starting the fan, an initial signal value of the second driving signal is at a minimum duty cycle for operating the fan, and the minimum duty cycle for starting the fan is larger than the minimum duty cycle for operating the fan;
wherein the signal value of the first driving signal non-linearly decreases, the signal value of the second driving signal is an unchanged value;
wherein the first time period and the second time period are adjusted for a different fan but the sum of the first time period and the second time period is always the same.

9. The method of claim 8, wherein the signal value of the second driving signal is a constant value.

10. The method of claim 8, wherein the fan comprises an impeller and a control circuit, the motor is connected to the impeller and drives the impeller to operate, the motor is electrically connected to the control circuit, the control circuit comprises a control unit and a detection unit, the detection unit detects the current phase or back emf of the motor to output a feedback signal to the control unit, the method further comprises:
after completing the fan open loop start-up stage, providing a third driving signal to drive the fan according to the feedback signal.

11. The method of claim 10, wherein the first driving signal, the second driving signal and the third driving signal are provided by the control unit.

12. The method of claim 10, wherein the third driving signal is PWM signal or DC voltage signal.

13. The method of claim 8, wherein the first driving signal and the second driving signal are PWM signals or DC voltage signals.

14. The method of claim 8, wherein
at a beginning of the first time period, the first driving signal increases a rotational speed of the fan.

15. The method of claim 14, wherein
during the full period of the first time period, the first driving signal increases the rotational speed of the fan; and
during a full period of the second time period, the second driving signal increases the rotational speed of the fan.

\* \* \* \* \*